United States Patent [19]

Meichsnër et al.

[11] Patent Number: 5,183,502

[45] Date of Patent: Feb. 2, 1993

[54] WATER BASED INK FOR INK-JET PRINTING

[75] Inventors: Roland Meichsnër, Buttenheim; Werner Schmickl, Neumarkt, both of Fed. Rep. of Germany

[73] Assignee: Hewlett-Packard Company, Palo Alto, Calif.

[21] Appl. No.: 433,294

[22] Filed: Nov. 8, 1989

Related U.S. Application Data

[63] Continuation-in-part of Ser. No. 195,579, May 18, 1988, abandoned.

[51] Int. Cl.$^5$ ............................................. C09D 11/02
[52] U.S. Cl. .................................. 106/22 K; 106/20 D
[58] Field of Search ............................. 106/20, 22

[56] References Cited

U.S. PATENT DOCUMENTS

| | | | |
|---|---|---|---|
| 3,692,548 | 9/1972 | Packer | 106/22 |
| 3,705,043 | 12/1972 | Zabiak | 106/22 |
| 4,170,482 | 10/1979 | Mansukhani | 106/20 |
| 4,184,881 | 1/1980 | Bradley | 106/22 |
| 4,196,007 | 4/1980 | Mansukhani | 106/22 |
| 4,239,543 | 12/1980 | Beasley | 106/22 |
| 4,239,544 | 12/1980 | Strem | 106/22 |
| 4,383,859 | 5/1983 | Moore et al. | 106/22 |
| 4,620,875 | 11/1986 | Shimada et al. | 106/22 |
| 4,781,758 | 11/1988 | Gendler et al. | 106/22 |

FOREIGN PATENT DOCUMENTS 167775 12/1981 Japan.
018772  1/1982 Japan.

OTHER PUBLICATIONS

English Translation of JP56/167775, pp. 1–12 Jul. 1980.
English Translation of JP57/18772, pp. 1–9 May 1980.
Grant & Hackh's Chemical Dictionary, 5th Ed. 3-88, p. 265.

*Primary Examiner*—Mark L. Bell
*Assistant Examiner*—Helene Klemanski

[57] ABSTRACT

Water based ink for ink-jet printing, consisting of:
- 0.5–8 wt % water soluble dye
- 1–64 wt % glycol
- 0.01–5 wt % wetting agent
- 0.01–2.0 wt % preservative, pH-regulator, complexing agents and/or other additives,
- as well as distilled water, where glycol consists of triethylene glycol or a mixture of triethylene glycol and ethylene glycol and the wetting agent is a formulation of the following structure $$CH_3-\underset{\underset{H}{|}}{CH}-CH_2-\underset{\underset{R}{|}}{\overset{\overset{CH_3}{|}}{C}}-C\equiv C-\underset{\underset{R}{|}}{\overset{\overset{CH_3}{|}}{C}}-CH_2-\underset{\underset{H}{|}}{\overset{\overset{CH_3}{|}}{CH}}-CH_3$$

where R=OH or R=(O—CH$_2$—CH$_2$)$_n$—OH with n=1 to 30.

6 Claims, 1 Drawing Sheet

WATER BASED INK FOR INK-JET PRINTING

CROSS-REFERENCE TO RELATED APPLICATION

The present application is a continuation-in-part application of Ser. No. 07/195,579, filed May 18, 1988, and now abandoned.

TECHNICAL FIELD

This invention concerns a water based ink for ink-jet printing with the characteristics of the main concepts in the main claims.

BACKGROUND ART

Ink systems for ink-jet printing, of the continuous jet method, in which a steady stream of droplets are being generated, electrostatically charged and then as needed are deflected, or as in a drop-on-demand method, where individual droplets are generated, are becoming more common in many areas.

The requirements on inks used in ink-jet printing methods are strict. Especially they must not clog the ink-jet nozzles. They cannot corrode or attack the printhead materials and must have a good shelf-life, i.e. they should not fail during storage and must retain a constant viscosity and surface tension. Such inks are known.

German Offenstellung 31 06 208 is an ink for ink-jet printing consisting of an aqueous solution of a water-soluble dye and an isomeric alcohol with 1 to 4 carbon atoms, which has a viscosity of 4 to 20 mPas, a surface tension of 40 to 60 mN/m and a specific resistivity of $5 \times 10^3$ to $1 \times 10^5$ Ohm.cm. Isomeric alcohols with 1 to 4 carbon atoms are for example glycols. As surfactants, i.e. as a wetting agent one proposes here non-ionic surfactants, such as polyoxyalkylene and its alkylether, siloxane/oxyalkylene-mixing polymer and fluoride containing surface active agents.

Though this ink satisfies the general requirements for ink-jet printing, it has unsatisfactory print quality on plain paper. It quickly fatigues the human eye because the print suffers from irregular fuzzy dot edges. It is therefore unsatisfactory.

In U.S. Pat. No. 4,383,859 an ink for ink-jet printing is described with the following constituents: 3 to 10 wt % dye, 10 wt % Carbowax 200 (polyethylene glycol), 10 wt % diethylene glycol, 4 wt % butyl carbitol, 4 wt % n-methyl-2- pyrrolidone, 0.25 wt % Surfynol 104 (tetramethyl-decyne-diol), 0.2 wt % Triton QS-44 (surfactant), 0.5 wt % Versenol 120, 0.1 wt % Sodium Omadine (a biocide), 64.95 to 67.95 wt % distilled water and 0.1 to 1 wt % ammonium hydroxide.

By and large, this ink is sufficient for the requirements of physical qualities of an ink for ink-jet printing. But in this case as well, plain paper print quality is unsatisfactory because of non-round and fuzzy dot edges. Additionally such inks dry in uncapped nozzles in a few hours.

In U.S. Pat. No. 4,184,881, an ink-jet printing ink is described which deliberately omits the use of glycols or ethylene glycols, and which has in it the following constituents: an aqueous solution of a water soluble dye, together with an ethylene oxide adduct that contains at least an acetylene diol (e.g. 2,4,7,9- tetramethyl-5-decyne-4,7-diol).

This ink also exhibits the necessary physical qualities for ink-jet printing, but is also suffers from lack of print quality on plain paper because of unsatisfactory dot roundness.

Additionally, it has been shown that an uncapped printhead with such ink will be completely plugged after 3 days and then will not be print-ready.

Although ink-jet printing is quite common today, this method of printing on plain paper still poses many problems for the human eye, that is, it tires quickly. Additionally, one could not expect a lot of aesthetic qualities out of such print. Both are consequences of the characteristics of known inks which lead to inadequate roundness of the dots. As a solution to this, special papers are being offered, which result in round dots.

BRIEF DESCRIPTION OF THE DRAWING

The sole FIGURE is a plan view of a dot of ink, depicting the diameter of the largest possible inner circle and the smallest possible outer circle.

DISCLOSURE OF INVENTION

Figure 1:
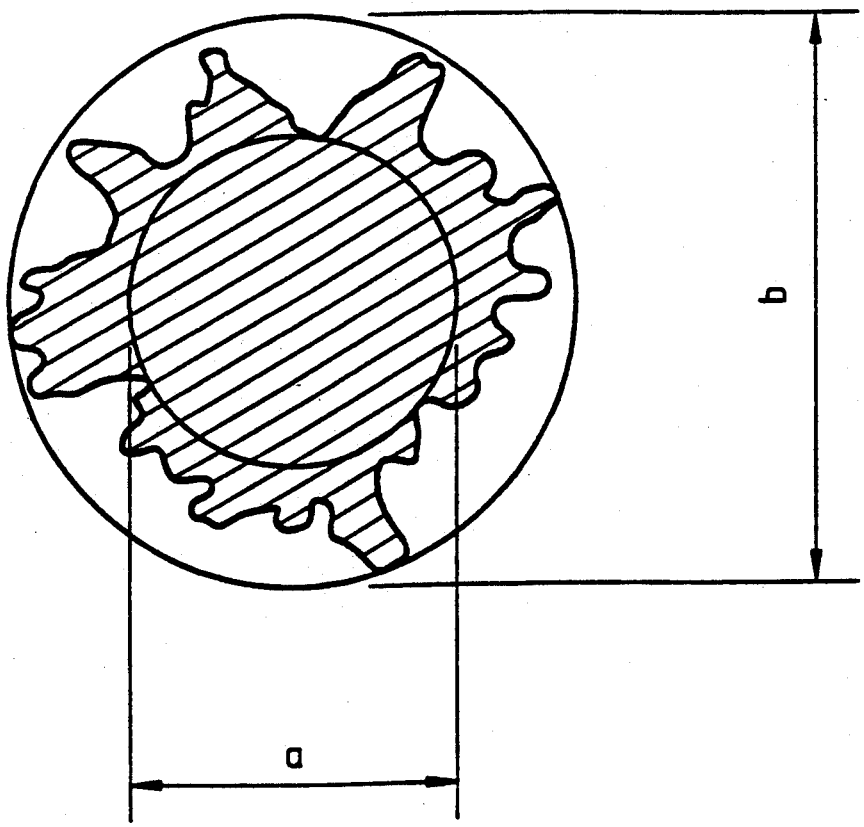

The task of this invention, however, is to create an ink for ink-jet printing which has good print quality on all papers, i.e. it yields adequately round and even dots on so-called plain paper, without causing fatiguing of the human eye and which additionally satisfies the physical requirements and which does not dry up in uncapped nozzles.

This requirement is solved with the distinguishing characteristic of the main claim. Surprisingly, it has been found that in an ink consisting of a water-soluble dye, glycol, a wetting agent, a preservative, such as halogen containing acid amide-derivatives and similar additives, pH-regulators, such as triethanolamine or ammonium hydroxide and/or complexing agents, such as ethylenediamine tetraacetic acid (tetrasodium salt, trisodium salt) (EDTA), as well as water, the combination of a glycol constituent of triethylene glycol or a mixture of triethylene glycol and ethylene glycol with a wetting agent with the general chemical structure of

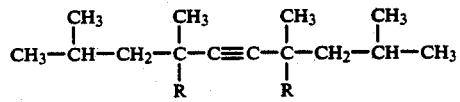

(where R=OH or R=(O—CH$_2$—CH$_2$)$_n$—OH with n=1 to 30) leads to an ink for ink-jet printing which not only satisfies the physical requirements, such as storage life, constant viscosity and surface tension, which does not exhibit plugged nozzles and which does not corrode, but which also prints dots on plain paper, which are friendly to the eye and which satisfies aesthetic requirements in that it is of an even quality with good roundness which exhibits fault-free print quality comparable to special paper print. Particularly advantageous is the mixing ratio of ethylene glycol and triethylene glycol between 0.1 and 6.0.

A particularly advantageous wetting agent with the above mentioned general chemical formula is 2,4,7,9-tetramethyl-5-decyne-4,7-diol with this structure

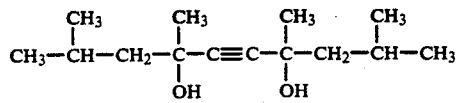

preferably in a ratio of 0.3 to 3.0 wt %. It also has been shown that this wetting agent foams much less than other wetting agents. Furthermore of an advantage are other constituents, such as 1,2,6-hexanetriol, hexylene glycol or propylene glycol.

Suitable dyes for the ink of this invention are water soluble acid, reactive and direct dyes. For example, it is especially advantageous to use:

CI Reactive Red 124, 147, 155, 159, 180, 187, 188, 190;
CI Reactive Yellow 37;
CI Reactive Black 31;
CI Reactive Blue 21;
CI Acid Blue 104;
CI Acid Green 16;
CI Acid Black 2;
CI Direct Red 253;
CI Direct Black 163;
CI Direct Yellow 152 and 157 as well as sulfonated azo-coloring agents out of these groups

1–48 wt % ethylene glycol,
1–16 wt % triethylene glycol, in which the ratio of the ethylene glycol and triethylene glycol mixture is to be between 0.1 and 6.0,
0.3–3.0 wt % 2,4,7,9-tetramethyl-5-decyne-4,7diol,
0.05–0.5 wt % preservative, and
distilled water.

As a test, the roundness of a dot of one of the invented inks was compared to that of three other inks. For this purpose, 50 dots, produced by an ink-jet of the drop-on-demand type, were measured under the microscope. Both piezoelectric and thermal ink-jet based systems were used.

As substrates, four different so-called plain papers were chosen: Xerox 80 (copier paper), Hammermill 9000, Typewriter paper and Epson dot matrix paper. The generated dots were measured and the ratio of the diameter of the largest possible inner circle, a, and that of the smallest possible outer circle, b, determined and multiplied by 100. The center of both circles do not necessarily coincide. This value is a measure for the

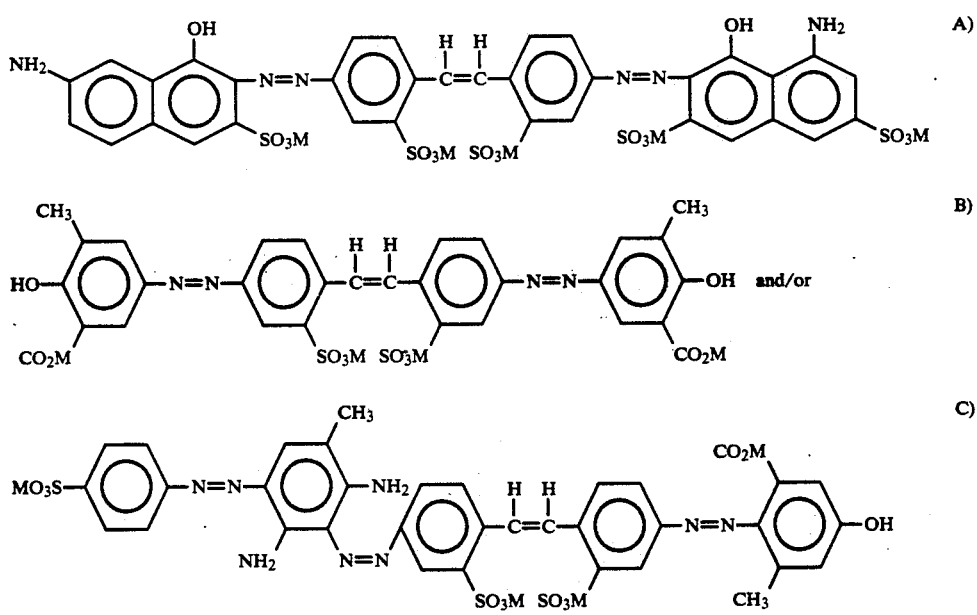

where M is a cation of lithium, sodium, a di- or triethanolammonium or a di- or tri-isopropanolammonium and is present in the molecular formula as a mixture of such cations or alone.

According to this invention, the inks consist of:
0.5–8 wt % of a water soluble dye mentioned above;
1–64 wt % triethylene glycol or a mixture of ethylene glycol and triethylene glycol;
0.01–5 wt % surfactant of the previously mentioned general structure, i.e. 2,4,7,9-tetramethyl-5-decyne-4,7-diol;
0.01–2.0 wt % preservative, such as halogenated acid amide derivatives, buffers, complexing agents and-/or other additives; as well as distilled water.

They have a viscosity of 1.5–25 mPas (at 20° C.) and a surface tension over 31.3 mN/m. Their drytime on paper is very short (less than 1 sec at the most) and printheads for ink-jets print instantly after 20 days without a cap at a relative humidity of 15%.

Preferably, the inks of this invention consist of:
1–8 wt % of a water soluble dye, roundness of the drop (TR):

$$TR = (a/b) \times 100\%,$$

where a is the diameter of the largest possible inner circle and b is the diameter of the smallest possible outer circle.

If TR=100%, it means that the inside diameter is equal to the outside diameter and that therefore the maximum roundness of the dot has been achieved (circular). Special papers are known to generate roundness of over 90%.

The drawing shows a dot with the diameter of the largest possible inner circle (a) and the smallest possible outer circle (b).

EXAMPLES

Example 1

As an ink covered by this invention, an ink was prepared out of 6.2 wt % of a sulfonated azo dye of the group:

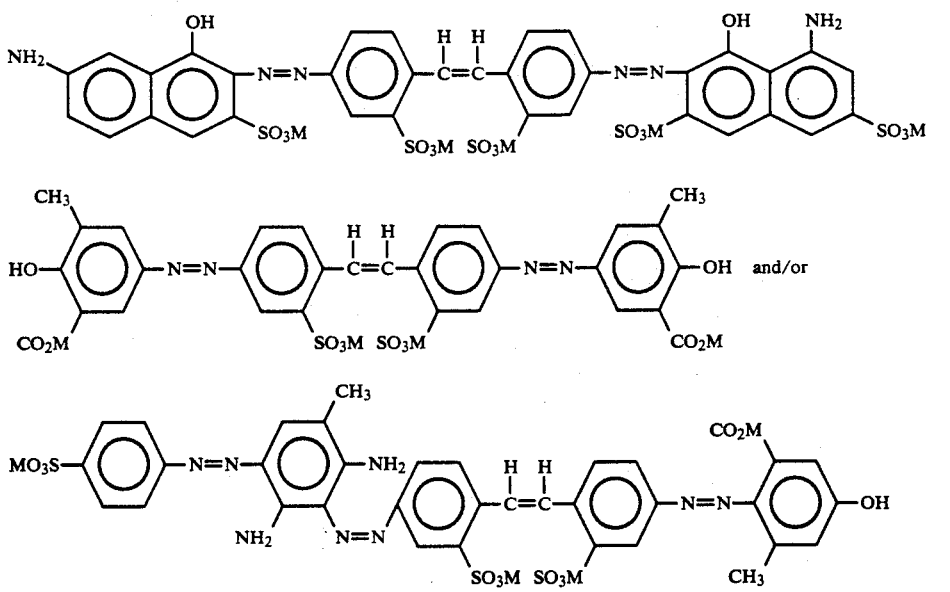

where the cation M is either lithium, sodium, a di- or triethanolammonium or a di- or tri-isopropanolammonium or a mixture thereof,
40 wt % ethylene glycol,
8 wt % triethylene glycol,
0.6 wt % 2,4,7,9-tetramethyl-5-decyne-4,7-diol,
0.2 wt % preservative,
45 wt % distilled water.

Comparative Examples

A. An ink according to example 2 of the U.S. Pat. No. 4,184,881 of
75 wt % distilled water,
5 wt % of an ethylene-derivative of 2,4,7,9-tetramethyl-5-decyne-4,7-diol,
10 wt % Direct Blue 218,
10 wt % CI Direct Black 38.

B. An ink according to U.S. Pat. No. 4,383,859 of
7 wt % CI Acid Black 2 (Nigrosine),
10 wt % Carbowax 200 (polyethylene glycol 200),
10 wt % diethylene glycol,
4 wt % butyl carbitol,
4 wt % N-methyl-2-pyrrolidone,
0.25 wt % 2,4,7,9-tetramethyl-5-decyne-4,7-diol,
0.2 wt % Triton QS-44,
0.5 wt % Versenol 120,
0.1 wt % Sodium Omadine,
63.35 wt % water,
0.6 wt % ammonium hydroxide.

C. Ink corresponding to example 1 of the German Offenstellung 31 06 208 of
2.5 wt % Acid Blue 104,
43.8 wt % ethylene glycol,
10 wt % diethylene glycol,
10 wt % triethylene glycol,
33.5 wt % distilled water,
0.2 wt % preservative.

Results of the experimental set (dot circularity in percent) are set forth in Table I, below:

TABLE I

| | Comparison of Inks. | | | |
| | Inks according to invention, | Comparative Inks | | |
| Paper Type | Ex. 1 | Ink A | Ink B | Ink C |
| Xerox 80 | 78.31% | 68.18% | 65.36% | 59.48% |
| Hammermill 9000 | 77.04% | 58.80% | 68.45% | 66.59% |
| Epson paper | 78.69% | 63.51% | 65.11% | 62.89% |
| Typewriter paper | 81.20% | 67.48% | 61.11% | 66.06% |

The inks according to the invention show a significantly higher dot circularity than that of those it was compared to, and is therefore really pleasing to the eye and allows a more aesthetic print.

Additional examples of inks according to the invention are:

Example 2

3 wt % CI Reactive Black 31,
20 wt % triethylene glycol,
0.02 wt % 2,4,7,9-tetramethyl-5-decyne-4,7-diol,
0.1 wt % preservative,
76.88 wt % distilled water.

Example 3

6 wt % dye as in Example 1,
20 wt % ethylene glycol,
7 wt % triethylene glycol,
0.5 wt % 2,4,7,9-tetramethyl-5-decyne-4,7-diol,
0.1 wt % preservative,
66.4 wt % distilled water.

Example 4

7 wt % CI Direct Black 163,
44 wt % ethylene glycol,
18 wt % triethylene glycol,
1 wt % 2,4,7,9-tetramethyl-5-decyne-4,7-diol,
0.2 wt % preservative,
29.8 wt % distilled water.

Example 5

8 wt % CI Reactive Red 180,
5 wt % triethylene glycol, 1.8 wt % 2,4,7,9-tetramethyl-5-decyne-4,7-diol,
0.2 wt % preservative,
0.4 wt % triethanolamine,
0.3 wt % EDTA (tetrasodium salt),
84.3 wt % distilled water.

Example 6

3.0 wt % of a sulfonated azo dye of Example 1,
5.0 wt % triethylene glycol,
0.01 wt % 2,4,7,9-tetramethyl-5-decyne-4,7-diol,
5.0 wt % preservative,
91.79 wt % water.

Example 7

6.0 wt % of a sulfonated azo dye of Example 1,
10 wt % ethylene glycol,
10 wt % triethylene glycol,
5 wt % 2,4,7,9-tetramethyl-5-decyne-4,7-diol,
0.2 wt % preservative,
68.8% water.

Example 8

3.0 wt % of a sulfonated azo dye of Example 1,
1.0 wt % triethylene glycol,
0.6 wt % 2,4,7,9-tetramethyl-5-decyne-4,7-diol,
0.2 wt % preservative,
95.2 wt % water.

Example 9

6.0 wt % of a sulfonated dye of Example 1,
0.01 wt % triethylene glycol,
63.99 wt % ethylene glycol,
0.6 wt % 2,4,7,9-tetramethyl-5-decyne-4,7-diol,
0.2 wt % preservative,
29.2 wt % water.

Comparative Examples

D. 7.0 wt % CI Acid Black 2,
10 wt % polyethylene glycol 200
10 wt % diethylene glycol,
4 wt % butyl carbitol,
4 wt % N-methyl-2-pyrrolidone,
0.1 wt % sodium omadine,
64.89 wt % water.

E. 7.0 wt % CI Acid Black 2,
10 wt % polyethylene glycol 200,
10 wt % diethylene glycol,
4 wt % butyl carbitol,
4 wt % N-methyl-2-pyrrolidone,
5 wt % 2,4,7,9-tetramethyl-5-decyne-4,7-diol,
0.1 wt % sodium omadine,
59.0 wt % water.

F. 7.0 wt % CI Acid Black 2,
10 wt % polyethylene glycol 200,
10 wt % diethylene glycol,
4 wt % butyl carbitol,
4 wt % N-methyl-2-pyrrolidone,
0.6 wt % 2,4,7,9-tetramethyl-5-decyne-4,7-diol,
0.1 wt % sodium omadine,
64.3 wt % water.

The results of the experimental data of Examples 6–9 and Comparative Examples D–F are tabulated below in Table II with respect to dot circularity in percent:

TABLE II

| | Comparison of Inks. | | | | | | |
| | Inks according to invention | | | | Comparative Inks | | |
| Paper Type | Ex. 6 | Ex. 7 | Ex. 8 | Ex. 9 | D | E | F |
| --- | --- | --- | --- | --- | --- | --- | --- |
| Xerox 80 | 80.21 | 75.35 | 75.76 | 90.65 | 63.1 | 68.99 | 65.57 |
| Hammer. 9000 | 79.29 | 70.48 | 72.19 | 73.33 | 64.89 | 65.11 | 66.90 |
| Epson paper | 76.28 | 72.91 | 72.72 | 85.21 | 62.38 | 63.92 | 63.85 |
| Typewr. pap. | 82.09 | 76.71 | 77.69 | 87.34 | 71.16 | 74.12 | 72.80 |

Again, the inks according to the invention show a higher dot circularity than that of those inks compared to.

What is claimed is:

1. Water based ink for ink-jet printing, consisting essentially of:
   0.5–8 wt % water soluble dye,
   1–64 wt % glycol comprising a mixture of ethylene glycol and triethylene glycol in a ratio of 0.1 to 6.0,
   0.01–5 wt % wetting agent,
   0.01–2.0 wt % preservative, pH-regulator, complexing agents, other additives, or mixtures thereof,
   as well as distilled water,
   where the wetting agent is a formulation of the following structure

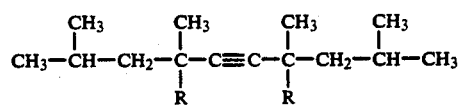

where R=OH or R=(O—CH$_2$—CH$_2$)$_n$—OH with n=1 to 30.

2. Water based ink as in claim 1 having the distinguishing characteristic, that as a wetting agent the following chemical structure is used

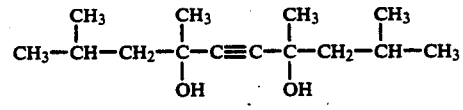

known as 2,4,7,9-tetramethyl-5-decyne-4,7-diol.

3. Water based ink as in claim 1, having the distinguishing characteristic, that the wetting agent portion is between 0.3 and 3.0 wt %.

4. Water based ink as in claim 1, having the distinguishing characteristics which has additional components 1,2,6-hexanetriol, hexylene glycol, propylene glycol or mixtures thereof.

5. Water based ink as in claim 1, having the distinguishing characteristics that the composition consists of:
   1–8 wt % of a water soluble dye,
   1–48 wt % ethylene glycol,
   1–16 wt % triethylene glycol, in which the ratio of the ethylene glycol and triethylene glycol mixture is to be between 0.1 and 6.0,
   0.3–3.0 wt % 2,4,7,9-tetramethyl-5-decyne-4,7-diol,
   0.05–0.5 wt % preservative, and
   distilled water.

6. Water based ink for ink-jet printing, consisting essentially of:
   0.5–8 wt % water soluble dye,
   1–64 wt % glycol comprising a mixture of ethylene glycol and triethylene glycol in a ratio of 0.1 to 6.0,
   0.01–5 wt % wetting agent, 0.01–2.0 wt % preservative, pH-regulator, complexing agents, other additives, or mixtures thereof, as well as distilled water,
where the wetting agent is a formulation of the following structure
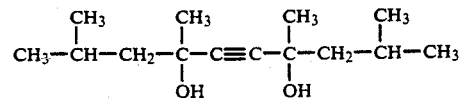
known as 2,4,7,9-tetramethyl-5-decyne-4,7-diol.
* * * * *